United States Patent

[11] 3,552,272

| [72] | Inventor | David Parsons |
| | | Leamington Spa, Warwickshire, England |
| [21] | Appl. No. | 793,112 |
| [22] | Filed | Jan. 22, 1969 |
| [45] | Patented | Jan. 5, 1971 |
| [73] | Assignee | Automotive Products Company Limited |
| | | Leamington Spa, Warwickshire, England |

[54] FLUID PRESSURE OPERATED SERVO-DEVICES
4 Claims, 1 Drawing Fig.

[52] U.S. Cl..................................................... 91/369,
                                                 91/376; 92/99
[51] Int. Cl..................................................... F15b 9/10,
                                                 F16j 3/00
[50] Field of Search............................................ 91/369,
             369B, 369A; 91/376(Cursory); 92/99

[56]          References Cited
              UNITED STATES PATENTS

| 2,832,316 | 4/1958 | Ingres............................ | 91/369B |
| 3,013,533 | 12/1961 | Brown........................... | 91/369B |
| 3,246,578 | 4/1966 | Randol........................... | 91/369B |
| 3,279,327 | 10/1966 | French........................... | 91/369A |

Primary Examiner—Paul E. Maslousky
Attorney—Lawrence J. Winter

ABSTRACT: A fluid pressure operated servodevice for assisting the operation of vehicle brakes including a movable wall, a pedal controlled valve operable to produce a pressure differential across the said movable wall, and an output member, has levers to transmit reaction force to the pedal, a resilient connecting member between the movable wall and the output member transmitting the braking effort directly to the output member independently of the levers until the said effort is sufficient to cause the said member to yield and bring the lever means into operation.

PATENTED JAN 5 1971  3,552,272
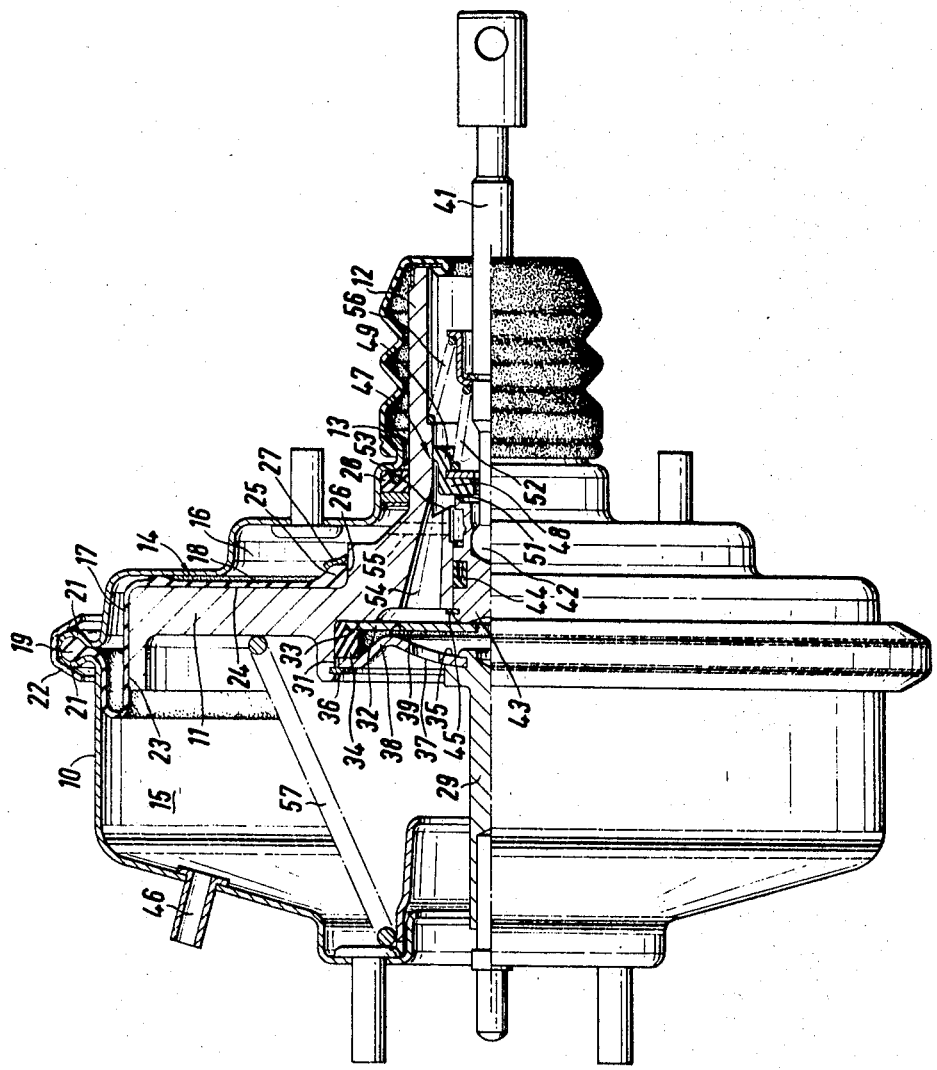
INVENTOR
David Parsons
BY
Lawrence J. Kunts,
ATTORNEY

FLUID PRESSURE OPERATED SERVO-DEVICES

This invention relates to fluid pressure operated servodevices especially for use in connection with vehicle braking systems to provide power assistance for the operation of the brakes, and has for its object to provide improved means for providing the operator with a satisfactory degree of "feel" so that he can judge, by the degree of reaction force on the pedal or other applying control, the degree of application of the brakes.

It has been found that, if the servodevice is brought into action by valve means actuated only when the operator is exerting sufficient effort to overcome the initial resistances to movement of brake shoes or pads into contact with brake drums or discs, these resistances are sufficiently great to call for a substantial effort on the part of the operator such that if the effort exerted by the operator is not reduced when the servodevice comes into action, the degree of braking may in many cases be too great. It has been proposed to overcome this disadvantage by arranging that the initial effort exerted by the operator serves only to actuate a control valve, the servodevice itself providing the effort necessary to move the shoes or pads into engagement with the drums or discs, and reaction being transmitted to the pedal or other control member only when the servodevice is exerting sufficient effort to produce braking.

In one such proposal, the reaction force has been transmitted to the control member through lever means which are brought into operation to apply the said reaction force only when a predetermined braking effort is being exerted by the servodevice. In that prior proposal, the lever means constituted the sole connection between the servodevice and the brake system.

According to the present invention, in a fluid pressure operated servodevice for a vehicle braking system comprising a movable wall to the opposite sides of which differential fluid pressures are applied to move it to actuate vehicle braking mechanism, the said fluid pressure differential being established by the operation of a valve controlled by a pedal or other control member and lever means being provided to transmit reaction force from said movable wall to the control member, there is provided, between the said movable wall and the braking mechanism, a resilient connecting member which transmits the braking effort directly to the braking system independently of the lever means until the said effort has reached a value at least sufficient to bring the brake shoes or pads into engagement with the drums or discs, the said resilient connecting member yielding as the effort increases so as ultimately to bring the lever means into operation.

The invention is hereinafter described with reference to the accompanying drawing which shows, partly in longitudinal section, one form of servodevice according to the invention.

Referring to the drawing, the servodevice comprises a cylindrical casing 10, a movable wall comprising a disc 11 carried by a sleeve 12 slidable through a coaxial opening 13 in one end of the casing, and a flexible annular diaphragm 14 cooperating with the disc 11 to divide the casing 10 into two chambers 15 and 16.

The flexible diaphragm 14 has an outer generally cylindrical portion 17 and a central flat portion 18, and, at its outer edge, is formed with a circumferential bead 19 clamped between curved flanges 21 on two separate metal pressings forming the casing 10, the flanges 21 being held together to clamp the bead 19 between them by a clamping ring 22. The disc 11 has an external cylindrical surface 23, and, as the disc moves axially in the casing, the generally cylindrical portion 17 of the diaphragm rolls from the internal surface of the casing on to this cylindrical surface 23, or vice versa. The flat portion of the diaphragm lies against a flat annular surface 24 on the si disc 11, a circumferential bead 25 on the inner edge of the diaphragm being held in the angle between the annular surface 24 and a cylindrical surface 26 on the sleeve 12 by a washer 27 as described in our copending application No. 792,199 filed Dec. 30, 1968.

The sleeve 12 is engaged by a sealing ring 28 in the opening 13 to make a fluid-tight joint. Coaxially mounted on the other end of the casing 10 is a liquid pressure master cylinder (not shown) serving as the pressure-producing device of a liquid pressure braking system, the piston of the said master cylinder being actuated by a push rod 29 to which thrust is transmitted from the disc 11 in a manner hereinafter described.

The end of the servodevice at which the master cylinder is mounted will hereinafter be referred to as the front end, and the end through which the sleeve 12 projects will be referred to as the rear end. The two chambers 15 and 16 into which the casing is divided by the disc 11 and diaphragm 14 will be correspondingly referred to respectively as the front and rear chambers.

The face of the disc 11 which is exposed to the front chamber 15 is formed with a central coaxial recess 31 in which are mounted a plurality of radial levers 32 the outer ends of which are held against an annular surface 33 in the recess by a compressible ring 34 of rubber or other elastomeric material. The said compressible ring 34 is retained in the recess by a rigid annular plate 35 itself retained in the recess by, for example, a clip ring 36 engaging in a circumferential groove in the peripheral wall of the recess 31. The inner periphery of the annular plate 35 is rigidly secured to the push rod 29, and the said plate 35 is formed with a plurality of apertures 37 and with an annular portion 38 offset from the general plane of the plate towards the inner end of the recess to provide a rounded annular surface 39 facing the levers 32. The arrangement is such that, when the compressible ring 34 is not axially loaded, and the levers 32 lie in a plane normal to the axis of the servodevice, the surface 39 on the plan plate 35 is spaced from the said levers.

A second push rod 41 extending into the sleeve 12 from its rear end is connected by suitable linkage (not shown) to a brake pedal or other operating member. The push rod 41 is coupled by a ball-and-socket joint 42 to a plunger 43 slidable in the inner end of the bore of the sleeve 12, leakage of liquid between the plunger 43 and the sleeve bore being prevented by a packing ring 44. Rearward movement of the plunger 43 is limited by a clip ring 45 engaged in a groove in the plug plunger and engaging the forward face of the disc 11. The inner ends of the levers 32 engage the front face of the plunger 43.

The servodevice is of the vacuum suspended type, the front chamber 15 being at all times connected through a tubular fitting 46 to a source of suction, and the rear chamber 16 being connectable either to the front chamber 15 or to the atmosphere through a valve 47 in the sleeve 12, the valve 47 being controlled by the push rod 41.

The valve 47 comprises a resilient seating disc 48 surrounding the push rod 41 with clearance and having a lip 49 which makes fluid-tight engagement with the inner wall of the sleeve 12 the said disc 48 being normally engaged by a rim 51 on the rear end of the plunger 43, against which it is urged by a spring 52, to prevent the entry of air through the sleeve 12. A shoulder 53 in the bore of the sleeve 12 provides a second seat against which the disc 48 is applied by forward movement of the push rod 41, the part of the sleeve bore immediately to the rear of the shoulder 53, being connected, through the 37 in the plate 35 and one or more passages 54 in the sleeve to the front chamber 15 of the servodevice, and the part of the sleeve bore in front of the shoulder 53 being connected by passages in the sleeve, one of which is shown in dotted lines at 55, to the rear chamber 16 of the servodevice. A retracting spring 56 is provided for the push rod 41.

When no pressure is being exerted on the brake pedal, the push rod 41 and plunger 43 are held in a rearward position, as shown in the drawing, by the retracting spring 56, the rim 51 on the plunger engaging the seating disc 48 and holding it off the seat on the shoulder 53. The chambers 15 and 16 of the servodevice are thus in communication one with the other, and there is no pressure differential across the diaphragm 14, so the disc 11 is urged rearwardly, to the position shown in the drawing, by a spring 57. The air inlet through the sleeve 12 is closed by the valve.

Pressure applied to the push rod 41 by means of the brake pedal moves the plunger 43 forwardly, displacing the levers 32 about their radially outer ends. This movement of the plunger causes the valve seating member 48 to seat on the shoulder 53 to isolate the chambers 15 and 16 of the servodevice one from the other, and moves the rim 51 on the plunger away from the seating member 48 to connect the chamber 16 to the atmosphere. The degree of movement of the plunger 43 necessary to open the connection to atmosphere is insufficient to bring the levers 32 into contact with the surface 39 on the plate 38. A pressure higher than that in the front chamber 15 is thus created in the rear chamber 16, moving the disc 11 forwardly, and thrust is transmitted by the said disc, through the resilient ring 34 and annular plate 38 to the push rod 29 to move the piston of the liquid pressure master cylinder. The thrust tends to compress the resilient ring 34, the resistance to compression of which is such that, until the brake shoes or pads are in engagement with the drums or discs and are exerting at least a small braking force, it does not deform sufficiently to bring the surface 39 on the annular plate 38 into contact with the levers 32. Once such contact is established, thrust is transmitted to the push rod 29 and the master cylinder piston through the levers 32, and a reaction thrust, the proportion of which to the thrust exerted by the disc 11 depends on the respective radial distances between the outer ends of the levers and the surface 39 on the rigid plate and between the said outer ends of the levers and their inner ends, is transmitted through the plunger 43 and push rod 41 to the brake pedal.

Thus no reaction force is applied to the brake pedal until the brakes begin to produce a retarding effect, and the effort required to initiate the braking operation is very light, so that the "feel" of the brake pedal is progressive throughout a braking operation.

It will be understood that changes may be made in the construction of the servodevice according to the invention. Thus the resilient ring may be replaced by some form of metal spring such as a coiled compression spring, or a stack of Belleville washers or a leaf spring and the rigid plate, instead of being formed with an annular offset portion, may be generally flat but having an annular rib or series of circumferentially spaced projections to contact the levers.

The servodevice, instead of being of the vacuum-suspended type, may have both of the chambers 15 and 16 normally connected to the atmosphere, compressed air being admitted to the chamber 16 ma to operate the servomotor, or the rear chamber 16 may be connected to the atmosphere, the valve being arranged to connect the front chamber 15 either to the rear chamber or to a source of suction.

The valve 47 may be different from that specifically described herein, many suitable valves for the purpose being already known.

I claim:

1. A fluid pressure motor device comprising a casing having a movable wall therein dividing it into two chambers to provide differential fluid pressures therein to move said wall and actuate a vehicle braking mechanism, said movable wall including a rigid disc portion, a first push rod member connected thereto to move said rigid wall, said rigid disc portion having a central recess therein, an annular plate member disposed in said recess, a second push rod member connected to the inner end of said plate member for actuating the master cylinder of a vehicle braking system, the outer circumferential portion of said plate member being sandwiched between a stop means and a compressible elastomeric ring member disposed in said recess, a plurality of radial levers disposed in said recess, and held against the bottom of said recess by said elastomeric ring member, said annular plate member having an arcuate surface extending in a direction toward said radial levers, said elastomeric ring member having a predetermined thickness of sufficient dimension to maintain said plate member out of contact with said radial levers until said first push rod member is moved a predetermined distance to compress said ring member and move said second push rod member a predetermined distance to apply a braking operation on a vehicle.

2. The motor device of claim 1 wherein said annular plate has a plurality of apertures therein, and a control valve is provided to seat against said disc portion and is operatively connected to said first push rod member.

3. The motor device of claim 1 wherein the inner ends of said levers are free ends.

4. The motor device of claim 3 wherein said ring member engages the outer end of said levers.